US006650681B1

(12) United States Patent
Ullman et al.

(10) Patent No.: US 6,650,681 B1
(45) Date of Patent: *Nov. 18, 2003

(54) SEALED EXHAUST CHEMICAL OXYGEN-IODINE LASER SYSTEM

(75) Inventors: Alan Zachary Ullman, Northridge, CA (US); Jan Vetrovec, Thousand Oaks, CA (US); Arthur H. Bauer, Newbury Park, CA (US); William E. McDermott, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/558,405

(22) Filed: Apr. 25, 2000

(51) Int. Cl.$^7$ .............................. H01S 3/04; H01S 3/20; H01S 3/095
(52) U.S. Cl. .............................. 372/89; 372/34; 372/54; 372/55; 372/58; 372/59
(58) Field of Search ............................ 372/89, 34, 54, 372/90, 55, 58, 59, 60, 705

(56) References Cited

U.S. PATENT DOCUMENTS

| | | |
|---|---|---|
| 3,668,881 A | 6/1972 | Thibault et al. |
| 3,879,680 A | 4/1975 | Naismith et al. |
| 3,992,685 A | 11/1976 | Ogren et al. |
| 4,267,526 A | 5/1981 | McDermott et al. |
| 4,360,923 A | 11/1982 | Thayer, III et al. |
| 4,494,381 A | 1/1985 | Lessard |
| 4,514,698 A | 4/1985 | Blumenthal et al. |
| 4,607,493 A | 8/1986 | Sukenobu |
| 4,650,416 A | 3/1987 | Warren, Jr. et al. |
| 4,653,062 A | 3/1987 | Davis et al. |
| 4,718,241 A | 1/1988 | Lessard et al. |
| 4,780,880 A | 10/1988 | Dickerson |
| 4,785,461 A | 11/1988 | Hook et al. |
| 4,787,091 A | 11/1988 | Wagner |
| 4,924,475 A | 5/1990 | Hinchen |
| 4,979,369 A | 12/1990 | Larin et al. |
| 5,005,363 A | 4/1991 | Larin |
| 5,014,517 A | 5/1991 | Larin et al. |
| 5,199,041 A | 3/1993 | Schmiedberger et al. |
| 5,624,654 A | 4/1997 | Clendening, Jr. et al. |
| 5,802,095 A | 9/1998 | Schall |
| 5,859,863 A | 1/1999 | Clendening, Jr. et al. |
| 6,154,478 A * | 11/2000 | Vetrovec ...................... 372/89 |

OTHER PUBLICATIONS

Haefer, René A., *Cryopumping Theory and Practice*, Chapter 5, Clarendon Press, Oxford, UK, 1989.

Newton, K.R. and Bernstein, R.B., "Cryosorption–Pumped CW Chemical Laser", Applied Physics Letters vol. 33(1), Jul. 1, 1978, pp. 47–49.

John Vetrovec, Chemical Oxygen–Iodine Laser with a Cryosorption Vacuum Pump, Photonics West Conference, Jan. 24, 2000, pp. 1–12.

* cited by examiner

*Primary Examiner*—Paul Ip
*Assistant Examiner*—Armando Rodriguez
(74) *Attorney, Agent, or Firm*—Harness Dickey & Pierce P.L.C.

(57) ABSTRACT

A sealed exhaust chemical oxygen-iodine laser (SECOIL) employing a sealed exhaust system (SES) is described. The SES is capable of selectively condensing and cryosorbing various chemical species contained in the laser-exhaust gas. Additionally, a condensable diluent is employed. The SES is configured so that the diluent and other condensables can be removed in a first stage with a high temperature condensing bed, while the oxygen can then be removed in a second stage in a low temperature sorbing bed. The result is a reduction in the weight, volume, and power consumption of the SECOIL system, especially the SES component thereof.

21 Claims, 7 Drawing Sheets

SEALED EXHAUST CHEMICAL OXYGEN-IODINE LASER SYSTEM

TECHNICAL FIELD

The present invention relates generally to chemical laser systems, and more particularly to an improved sealed exhaust chemical oxygen-iodine laser (SECOIL) system that employs, among other things, a sealed exhaust system that is capable of selectively condensing and sorbing various chemical species contained in the laser exhaust gas.

BACKGROUND OF THE INVENTION

The fact that an atom will emit a photon of radiation when one of its electrons drops to a lower energy state has enabled the laser to be employed in a number of military, industrial, and medical applications. The term "laser" is an acronym for light amplification by stimulated emission of radiation. In its simplest form, a laser consists of a rod of transparent crystal or a tube filled with gas or liquid. A reflecting mirror is placed at one end and a partially reflecting mirror at the other end. The laser is then "pumped" by adding energy, e.g., by shining another light source into it, by adding electrical energy, or by stimulating a chemical reaction. This process raises electrons in the laser to higher energy states.

During or subsequent to the pumping process, some of the electrons will spontaneously fall back to a lower energy state, emitting photons. The photons that travel toward the sides of the laser are quickly lost, but those traveling along the length of the rod or tube are reflected back by the mirrors. This activity generally occurs in the area commonly referred to as the laser gain region. When these photons strike other excited atoms, they stimulate those atoms to release photons of the exact same energy level (or wavelength), which travel in the same direction as the stimulating photons. The result is an intense, highly focused beam of light escaping through the half-silvered end of the laser. This light beam is generally referred to as a beam of coherent radiation, or more commonly, a laser beam.

Because the photon wavelength is determined by the characteristics of the atoms in the lasing material, laser light can be of a single wavelength. Because laser light travels in a tight beam, it can carry a great deal of energy over a great distance without significant loss. With respect to recent developments in laser technology, there has been increased interest in high-energy chemical laser systems.

High-energy chemical lasers can be classified as either: (1) hydrogen-halide lasers; or (2) chemical oxygen-iodine lasers (COIL). Hydrogen-halide lasers typically employ a reaction of hydrogen and/or deuterium with fluorine, chlorine, bromine or iodine in diluent gases of helium, nitrogen, or the like, to produce hydrogen and/or deuterium halide molecules in excited vibrational states from which laser energy can be extracted. Exhaust from the laser cavity of a hydrogen-halide laser is typically a mixture of gases at high temperature (up to 1000° C.) including HF (and/or DF), He, $N_2$, and possibly small amounts of $H_2$(and/or $D_2$) and other gases.

In a COIL system, chlorine gas, with or without a diluent gas such as nitrogen or helium, reacts with a solution of basic hydrogen peroxide (i.e., usually KOH or other strong base mixed with hydrogen peroxide) to produce a gaseous flow of excited oxygen, also referred to as singlet delta oxygen or singlet molecular oxygen (designated as $O_2^*$, $O_2(^1\Delta)$, as well as by other symbols). This gaseous flow of singlet delta oxygen collides (typically at speeds approaching or even exceeding the speed of sound) with iodine gas molecules (i.e., $I_2$), dissociating them and exciting the resulting iodine atoms (i.e.,I), which lase at 1.315 μm. The major laser byproducts are various salts (e.g., NaCl or KCl) and heat. Exhaust from the COIL laser cavity is typically a mixture of gases at near ambient temperature, including nitrogen or helium, oxygen, and small amounts of chlorine, iodine, and water. The small amounts of iodine can be scrubbed from the output.

The intended operation of a conventional COIL system can be summarized as follows. The initial step is to generate the singlet delta oxygen. This is accomplished by providing a source of basic hydrogen peroxide, typically in liquid form, and a source of molecular chlorine, typically in gaseous form. These two materials are then charged or injected into a singlet delta oxygen generator through appropriate manifold/conduit assemblies, respectively. The resulting exothermic reaction between the basic hydrogen peroxide liquid and the molecular chlorine gas produces the gaseous singlet delta oxygen, as well as several by-products, such as salt and heat. The heat can be removed by appropriate devices such as a heat exchanger, and the salt can be removed by appropriate devices such as a filter, if desired.

Once the gaseous singlet delta oxygen is generated, it is then charged or injected in flow form into a mixing nozzle at the appropriate time. The mixing nozzle has a throat portion which generally divides the mixing nozzle into a subsonic zone and a supersonic zone; that is, the flow of gaseous singlet delta oxygen is subsonic in one portion of the mixing nozzle and supersonic at the other portion of the mixing nozzle. The mixing of reactants is typically done in the subsonic zone, but their mixing can be done in other zones of the gain generator.

A molecular iodine generator is in communication with the mixing nozzle by an appropriate manifold/conduit assembly. At the appropriate time, gaseous molecular iodine is then charged or injected into the mixing nozzle in such a manner so as to partially or completely mix with the singlet delta oxygen gas flowing from the singlet delta oxygen generator. The mixing permits the singlet delta oxygen to dissociate some of the molecular iodine and thereby initiate the chain reaction dissociation by the product, excited atomic iodine.

The primary reactions taking place in connection with the conventional COIL system are as follows:

(1) $I_2 + {}_NO_2^* \rightarrow I_2^* + {}_NO_2$.

That is, a mole of molecular iodine reacts with a several (denoted by the symbol "N") moles of singlet delta oxygen to produce a mole of excited molecular iodine and several moles of molecular oxygen.

(2) $I_2^* + O_2^* \rightarrow 2I + O_2$.

That is, a mole of excited molecular iodine reacts with a mole of singlet delta oxygen to produce two mole of atomic iodine and a mole of molecular oxygen.

(3) $I + O_2^* \rightarrow I^* + O_2$.

That is, a mole of atomic iodine reacts with a mole of singlet delta oxygen to produce a mole of excited atomic iodine and a mole of molecular oxygen.

(4) $I^* + h\nu \rightarrow I + 2h\nu$.

That is, a molecule of excited atomic iodine interacts with a photon and releases a second photon (hv), thus producing a molecule of atomic iodine.

The singlet delta oxygen gas flow initially contacts the gaseous molecular iodine gas at subsonic speed; however, the singlet delta oxygen gas flow is quickly brought up to near supersonic or even supersonic speed (via appropriate devices such as a venturi) and is expelled out through the mixing nozzle into the area known as the laser cavity or laser gain region. It is in this area where the excited atomic iodine releases its photon. The released photon is then reflected many times between a set of mirrors, the first mirror being fully reflective, the second mirror being partially reflective. The reflected photons eventually form a laser beam, which is transmitted through the partially reflective mirror at a wavelength of 1.315 µm. Any remaining chemical species are removed from the laser gain region by a combination of exhaust assemblies and scrubber assemblies in order to avoid contamination of the laser's mirrors and to allow continuing flow of the laser chemicals so as to sustain the lasing process.

Of particular interest are the vacuum pumps which supply the required flow throughput and pressure which draws the gas mixture through the laser cavity. High-energy chemical lasers, especially for military applications, often produce hundreds of kilowatts of optical power. The c corresponding gas throughput in the range of 10–100 Torr pressure requires vacuum pumps with pumping speeds on the order of several hundred thousand liters per second.

Military applications for high-power chemical lasers include tactical air defense which necessitates deployment of laser weapons in forward positions on the battlefield. Such laser weapons must be transportable and, therefore, of limited size and weight. In addition, the laser weapon should be concealable and undetectable by the enemy.

In laboratory practice, mechanical vacuum pumps, roots blowers, and steam ejectors are used to maintain flow conditions in chemical lasers. Gas exhausted from chemical lasers often contains hazardous materials such as iodine, chlorine, fluorine, hydrogen and hydrogen fluoride. In order to prevent the release of such materials into atmosphere, the laser exhaust gas must be scrubbed. Mechanical pumps with their concomitant scrubbers are too heavy and bulky for use in a transportable, field-deployable, high-power laser system. To overcome the size and volume limitations of mechanical pumps, Naismith et al. in U.S. Pat. No. 3,879,680 proposed a decontamination-capable, combustion-driven ejector for a hydrogen fluoride laser. However, ejectors, although smaller in size and weight than corresponding mechanical pumps, are still excessively large and heavy for use in a transportable COIL system where low cavity pressure necessitates multi-stage pumping. Furthermore, operation of ejectors is typically accompanied by acoustic noise and liberation of large amounts of hot gases and/or steam into the atmosphere which significantly reduce concealment and increase detectability of the high-power laser weapon and may interfere with the propagation of the laser beam.

A vacuum pump capable of pumping and safely containing exhaust from a hydrogen fluoride laser has been disclosed by Ogren et al. in U.S. Pat. No. 3,992,685. Pumping action here is produced by chemically reacting laser cavity exhaust gases with titanium, zirconium, and other reactive metals at elevated temperature. The laser exhaust is thus safely contained within the vacuum pump envelope. A refinement of Ogren's device and process was disclosed by Blumenthal et al. in U.S. Pat. No. 4,514,698 where pumping action is produced by a combination of condensation (to remove HF and/or DF), chemical reaction with Ti, Zr, etc. (to remove $O_2$, $H_2$ and/or $D_2$) and cryogenic adsorption to remove nitrogen. A considerable disadvantage of Ogren's and Blumenthal's processes is the need to separately remove constituents from the flow in several steps, some of which require high temperature reactions with metals. Because some of the reactions with metals are difficult to reverse, it can be deemed that neither Ogren's nor Blumenthal's apparatus could be easily regenerated. Blumenthal describes cryosorption of nitrogen only as a part of the multi-step pumping process, whereas oxygen is pumped by reaction with hot metals. In summary, the inventions of Ogren and Blumenthal are very specific for use with the hydrogen-halide laser and no reference is made to show how they may be adapted to a COIL system.

Cryosorption pumps of various designs have been used in the vacuum industry for many years (Cryopumping Theory and Practice, Chapter 5, by Rene A. Haefer, Claredon Press, Oxford, UK, 1989). Sorption pumps function by the physical adsorption of gases at the surface of molecular sieves or other sorption materials (e.g., activated $Al_2O_3$ or charcoal). Such materials have an extraordinarily large specific surface area per unit of mass (hundreds of $m^2/g$). Correspondingly, the capability of gas adsorption is considerable, up to 200 mg of nitrogen per g of synthetic zeolite (e.g., Linde 4A, manufactured by Union Carbide Corp., Danbury, Conn.) at the temperature of liquid nitrogen (77° K). A variety of natural and synthetic zeolites are currently readily commercially available. Sorption capacity of zeolites (i.e., maximum amount of gas that can be stored) is highly dependent on zeolite temperature and the pressure of gas above the sorption surface. In particular, at a constant pressure, the sorption capacity increases with decreasing temperature, while at a constant temperature, the sorption capacity decreases with decreasing pressure. For example, at a pressure of 10 Torr, changing the temperature from 293° K. to 77° K. increases the capacity of zeolite (e.g., Linde 4A) to sorb to nitrogen more than 200 times. Furthermore, during the sorption process, the sorption effect decreases with increased coverage of the sorption sites.

The sorption capacity of zeolites is also highly dependent on the gas to be pumped. In general, light inert gases are hardly pumped at all. For example, the capability of synthetic zeolite (e.g., Linde 4A) to pump helium or neon at a temperature of 80° K. is several orders of magnitude lower than for COIL system gases, such as oxygen and nitrogen.

In general, cryosorption vacuum pumps can be classified as roughing and hard vacuum type. Cryosorption vacuum pumps for roughing applications are capable of evacuating vacuum chambers from atmospheric pressure down to a fraction of a Torr. These devices are usually quite simple in construction, comprising a metal flask containing zeolite. Vacuum suction is obtained at the flask throat as the flask is immersed into a bath of liquid nitrogen. The pumping process exerts a heat load to the zeolite. The heat load is due to a change in enthalpy of the gas as it is being cooled to the temperature of the zeolite and release of the heat of sorption. Because the zeolite can adsorb atmospheric oxygen and nitrogen only when cold, the pumping capacity of a zeolite roughing pump depends on its effectiveness to reject the heat load to the liquid nitrogen. The problem of maintaining the zeolite at low temperature is further compounded by zeolite's poor thermal conductivity. Zeolite roughing pumps are normally used in applications where time is not critical. Pump-down times on the order of 10–60 minutes are acceptable.

Cryosorption vacuum pump s f or hard vacuum applications (e.g., below $10^{-3}$ Torr) normally encounter a lower head load than roughing pumps. This is due both to the reduced gas density and a refrigerated baffle (usually a chevron style) which is normally located at the intake to the pump and cools the incoming molecular flow of gas. Various designs of such pumps have been disclosed in prior art, for example by Thibault et al. in U.S. Pat. No. 3,668,881;

Lessard et al. in U.S. Pat. Nos. 4,494,381 and 4,718,241; Sukenobu in U.S. Pat. No. 4,607,493, and Larin et al. in U.S. Pat. Nos. 4,979,369, 5,005,363 and 5,014,517. It should also be noted that cryosorption vacuum pumps for hard vacuum applications are not suitable for operation at high pressures (e.g., significantly above $10^{-3}$ Torr) due to their inability to reject the concomitant increase in heat load.

A hydrogen-halide laser entirely pumped by cryosorption has been described by Newton et al. in the article entitled: "Cryosorption-Pumped CW Chemical Laser" which was published in the Applied Physics Letters vol. 33(1), on Jul. 1, 1978. Newton et al. used a commercially available zeolite sorption pump cooled by liquid nitrogen to operate a small (200–300 milliwatt) hydrogen-halide laser at cavity pressures of a few Torr and flow rates of several millimoles per second for periods of up to 6 hours. Because of its low flow rates, Newton's cryosorption pump has not experienced problems with rejection of heat of adsorption. However, Newton's concept is not scalable to a high-power chemical laser with its concomitant high flow rates.

In summary, a suitable cryosorption vacuum pump system for a COIL system requires the capability of handling relatively short (e.g., about 100 second) duration gas flow with a throughput on the order of 10–100 mol/s at about 10 to 30 Torr pressure. Gases to be pumped are expected to be at near ambient temperature (300 to 400°K), possibly moist (containing water vapor and possibly particulates), and contain corrosive and hazardous materials such as iodine and chlorine. Thus, a new cryosorption vacuum pump system, one specific for the needs of the COIL system, was needed. The cryosorption vacuum pump system should preferably be light-weight, compact, economical in refrigerant use, environmentally safe, and have a short regeneration time.

The Boeing Company has recently developed a proprietary sealed exhaust COIL system (SECOIL) including a sealed exhaust system (SES) that employs a cryosorption vacuum pump system that addresses the specific needs of the COIL system. The Boeing Company SECOIL has been disclosed in U.S. Pat. No. 6,154,478, issued to Vetrovec, and is further described below. Referring now to the drawings and the characters of reference marked thereon, FIG. 1 illustrates such a COIL system/cryosorption vacuum pump system, which includes a COIL system 10 and a cryosorption vacuum pump system 100. COIL system 10 utilizes a reaction of basic hydrogen peroxide liquor 12 and chlorine gas 11 which are supplied to a singlet oxygen generator 20 to produce excited oxygen gas in a metastable state known as the singlet delta oxygen ($O_2(^1\Delta)$) according to the reaction:

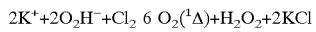

$$2K^+ + 2O_2H^- + Cl_2 \rightarrow 6\ O_2(^1\Delta) + H_2O_2 + 2KCl$$

Nitrogen gas 14 may be also provided to the singlet oxygen generator as a diluent without taking part in the chemical reaction therein. Static pressure inside the singlet oxygen generator 20 is about 30 to about 100 Torr. Depleted basic hydrogen peroxide liquor is discharged from the singlet oxygen generator 20 through line 15. The produced $O_2(^1\Delta)$ is separated from the liquor and diluted by the nitrogen gas 14. The mixture of $O_2(^1\Delta)$, nitrogen diluent and unreacted chlorine is directed from the singlet oxygen generator 20 into a laser nozzle 30 where it is mixed with a continuous supply 32 of iodine vapor carried by a stream of nitrogen gas. This process facilitates an energy transfer from the $O_2(^1\Delta)$ to the iodine, by dissociating iodine molecules into atoms and bringing the iodine atoms to an electronically excited states known as $^2P_{1/2}$. Flow in the diverging part of laser nozzle 30 is aerodynamically accelerated to a supersonic velocity of typically Mach 2. Supersonic flow from nozzle 30 enters the laser cavity 44 containing an optical resonator including mirrors 50, 51 in a vacuum enclosure 48. Using an optical feedback provided by the mirrors, a coherent laser light can be extracted from the inverted population of the exited iodine atoms in the supersonic flow. An outcoupled beam of coherent laser light 45 is passed through the window 53 to the outside of the vacuum envelope. During this process, the excited iodine atoms decay from a high energy state $^2P_{1/12}$ to a lower energy state $^2P_{3/2}$ while releasing photons at 1.315 micrometer wavelength. COIL systems with a subsonic (rather than supersonic) flow were disclosed by McDermott in U.S. Pat. No. 4,267,526.

Depleted laser gas flows from the laser cavity 44 into the diffuser 60. Additional nitrogen purge gas can be used to protect optical components inside the enclosure 48. Such purge gas is then added to the flow in the cavity 44. The flow entering the diffuser 60 is a gas mixture containing approximately 70% $N_2$, 27% $O_2$, 1% $Cl_2$, 1% $I_2$ and 1% $H_2O$ vapor. The diffuser 60 decelerates the flow and allows recovery of static pressure. Static pressure at the downstream end of the diffuser 60 is typically in range of about 5 to 20 Torr and the corresponding flow velocity is about Mach 0.1 to about Mach 0.3. Continuous flow of gas from the singlet oxygen generator 20 up to the end of the diffuser 60 under vacuum conditions is made possible by continuous suction provided by the cryosorption vacuum pump system 100.

Decelerated flow from the diffuser 60 enters the cryosorption vacuum pump system 100 through an isolation valve 101 in an open position. The flow is directed into a gas chiller 105. The chiller 105 includes a plurality of surfaces cooled to a temperature around 80° K. These surfaces are so arranged and disposed so as to chill the incoming gas flow to approximately 100° K. while condensing and/or freezing out chlorine gas, iodine and water vapor out of the flow and trapping them onto the cooled surfaces. Cold and dry gas containing only nitrogen and oxygen is directed from the gas chiller 105 through an isolation valve 106, in an open position, and toward a zeolite bed 110 in a vacuum vessel 120. The zeolite bed 110 uses a suitable zeolite sorption material such as synthetic zeolite, e.g., Linde 4A, cooled to a temperature of approximately 80° K. to adsorb and trap the incoming mixture of nitrogen and oxygen gas. The zeolite is preferably provided in granular form and is configured in layers several millimeters to several centimeters thick to provide a large exposed surface to the sorbed gas. Limiting the size of the granules and thickness of the zeolite layers provides a more direct path for the sorbed gas to travel to sorption sites in the zeolite, thereby reducing impedance to the flow and increasing effective pumping speed of the zeolite bed 110. Although synthetic zeolite is preferred, it should be noted that other sorption materials, such as natural zeolites or activated charcoal, may used in lieu thereof.

Cooling the gas chiller 105 and the zeolite bed 110 to the required temperature is accomplished by a suitable cryorefrigerant, such as liquid nitrogen or liquid argon, stored in dewar 130. When cooling is required, the cryorefrigerant is provided from dewar 130 through line 131 to refrigerant control valves 132 and 133 which respectively control flow through line 134 to the gas chiller 105 and through line 135 to the zeolite bed 110. The cryorefrigerant can be either gravity fed, pump fed, or fed by dewar pressure. Refrigeration can be realized by boiling-off cryorefrigerant inside heat exchangers (not shown) within the gas chiller 105 and the zeolite bed 110. Alternately, the refrigerant can be recirculated between the heat exchangers and external boilers. Other schemes for providing refrigeration of the laser gases in the gas chiller 105 and the zeolite bed 110 can be realized, as is well known to those skilled in the art of refrigeration. In either case, the supply of cryorefrigerant must be sufficient to cool down the gas chiller 105 and zeolite bed 110 to the required temperature, overcoming thermal leaks, rejecting the heat released by cooling and condensing and/or freezing out gases in the gas chiller 105 and rejecting the heat released by cryosorption onto the zeolite bed 110. A heat shield 121 is positioned between the zeolite bed 110 and the vacuum vessel 120. The heat shield reduces radiative and convective heat load to the zeolite bed 110. It can be constructed of multiple layers of polished sheet metal with small gaps therebetween, or of multiple layers of aluminum coated mylar, or other suitable means used in the cryogenic industry. In order to reduce convective heat load to the zeolite bed 110, the interior of the vacuum vessel 120 can be coated or lined with a thermally insulating material, for example, TEFLON™.

During operation of the COIL system 10, gases are drawn through the laser cavity 44 by suction provided by gas sorption onto the zeolite material in the zeolite bed 110. With increasing quantity of sorbed gas and constant temperature of the zeolite material, the pressure inside vacuum enclosure 120 steadily rises. At a point where the pressure differential between the vacuum enclosure 120 and the cavity 44 is no longer sufficient to sustain required supersonic flow through said cavity, the sorption capacity of the zeolite bed 110 is deemed exhausted, and operation of the laser 10 is terminated by shutting off the flows of chlorine 11, nitrogen 14, and iodine 32.

The cryosorption vacuum pump system 100 can be regenerated and made available for the next sorption cycle by removing the sorbed gas. The regeneration process is started by isolating the gas chiller 105 and the zeolite bed 110 from the laser 10 by closing the isolation valves 101 and 106. Then the supply of cryorefrigerant is terminated by closing the control valves 132 and 133. Finally, the gas chiller 105 and the zeolite bed 110 are allowed to warm up. The warm-up process can be accelerated by, for example, application of external heat either by electric heaters (not shown), recirculation of warm fluid through heat exchangers within the gas chiller 105 and the zeolite bed 110, microwave heating, dielectric heating, or by flowing a warm gas through the gas chiller 105 and the zeolite bed 110. Depending on the choice of cryosorption media, most of the sorbed gas can be released with only modest increase in temperature. For example, warming the Linde 4A zeolite from 78° K. to 180° K. can release over 90% of sorbed oxygen and nitrogen. Allowing removal of sorbed gas with only modest temperature increase economizes on use of cryorefrigerant. The temperature of the gas chiller 105 has to be increased substantially higher to allow removal of condensed and/or frozen chlorine gas and water vapor as either gas or liquid. Desorbed gas or liquid is removed from the system by means of auxiliary vacuum or liquid pumps 144 and 154. With the control valve 142 in open position, the vacuum pump 144 draws gas from the vacuum enclosure 120 through line 141 and 143, and exhausts the gas through line 145 into filter 146. The filter 146 traps hazardous materials such as iodine and chlorine which may be found in trace amounts in the flow through line 145. Clean gas is then exhausted through line 147 into the atmosphere. Gas or liquid liberated from the gas chiller 105 are removed in a similar fashion. With the control valve 152 in an open position, the vacuum pump 154 draws gas from gas chiller 105 through line 151 and 153, and exhausts the gas through line 155 into filter 156. The filter 156 traps hazardous materials such as iodine and chlorine which may be found in substantial amounts in the flow through line 155. Clean gas or liquid is then exhausted through line 157 into the atmosphere. When the gas chiller 105 and the zeolite bed 110 have been outgassed to a desirable level, the control valves 142 and 152 are closed, auxiliary vacuum pumps 144 and 154 are turned off, and the flow of refrigerant to the gas chiller 105 and zeolite bed 110 is restored by opening valves 132 and 133. After the gas chiller 105 and the zeolite bed 110 reach the desired temperature, the system 100 is deemed regenerated and available to provide vacuum suction for the COIL system 10. At this point, the isolation valves 101 and 106 can be opened and laser operation may commence. It should be noted that the regeneration process may last substantially longer than operation of the laser. For example, the laser may operate typically for only 100 seconds during which several hundred to several thousand mols of oxygen-nitrogen mixture are sorbed by the cryosorption pump system 100. The subsequent regeneration cycle may last from several minutes to several hours.

FIG. 2 is an illustrative diagram of the working function of the zeolite bed using the Linde 4A zeolite molecular sieve for a mixture of oxygen and nitrogen. The diagram plots the sorption capacity of the zeolite bed 110 versus logarithm of the pressure inside the vacuum enclosure 120. Sorption capacity is defined herein as the maximum amount of gas that can be sorbed onto the zeolite under specified pressure and temperature conditions of the gas. At point A there is no gas flow into the vacuum enclosure 120. The partial pressure of the $O_2$—$N_2$ mixture inside the enclosure 120 is substantially less than 1 Torr and the zeolite is at a temperature of 200° K. Under these conditions, Linde 4A zeolite contains only a small fraction of its sorption capacity at 77° K. Starting from point A conditions and cooling the zeolite from 200 to 77° K (point B) simultaneously increases zeolite sorption capacity and reduces the partial pressure of the $O_2$—$N_2$ mixture inside the enclosure 120. At point B the zeolite is suitable for efficient cryosorption. Operation of the COIL system 10 includes flowing a mixture of $O_2$—$N_2$ gases into the zeolite bed 110 where the mixture gets adsorbed. Providing that the heat released during adsorption is rejected into the refrigerant or absorbed by the thermal mass of the zeolite, the temperature of the zeolite during the sorption process remains essentially constant. With increased quantity of gas occupying sorption sites in the zeolite the partial pressure of the $O_2$—$N_2$ mixture inside the enclosure 120 steadily rises, thereby slightly increasing the sorption capacity. When the partial pressure of the $O_2$—$N_2$ mixture reaches the limit at point C the pressure differential between the enclosure 120 and the laser cavity 44 cannot sustain a supersonic flow through the cavity and the laser operation is terminated. With the isolation valves 101 and 106 in closed position, the zeolite is allowed to warm-up to about 200° K and liberate most of the adsorbed gas. During this process, the pressure inside the enclosure 120 steadily rises up to point D. Liberated gas is removed by the auxiliary vacuum pump 144 until the pressure inside the enclosure drops to below about 1 Torr, thereby returning the system to the starting point A. It should be understood that the FIG. 2 diagram represents an idealized process and is intended for illustration only. For example, under realistic operating conditions, a constant zeolite temperature cannot be easily maintained and, as a result, the actual working diagram of the zeolite bed 110 is somewhat more complex. Furthermore, in practice, it is desirable to remove desorbed gas from the vacuum enclosure 120 during the desorption process facilitated by the warm-up. This can be represented by a broken curve starting at point C and leading to point A in FIG. 2.

FIG. 3 shows a cryosorption assembly 200, containing a zeolite bed. The zeolite bed comprises a coaxial array of thin, washer-like annular containers 204 filled with sorption material 205. The sorption material 205 is preferably a synthetic zeolite, e.g., Linde 4A, provided in a granular form with a grain size of approximately 1 mm. Zeolite may be provided either as sintered particles or an agglomeration of loose particles. Thickness of the containers 204 is typically from several mm to several cm and is selected primarily to reduce impedance to gas flowing to sorption sites within the zeolite 205. The containers 204 have gaps therebetween to allow a flow of gas reaching both sides of the containers. The gap between adjacent containers 204 is roughly the same size as the thickness of the containers 204. Walls 206 of the containers 204 are constructed from porous, perforated or a screen-like material having pores or apertures which are substantially smaller than the size of the zeolite grains located inside the containers 204. The pores or apertures are intended to provide a path through which gas can flow into and out of the containers 204 without suffering significant pressure loss. The containers 204 are enclosed in a vacuum enclosure 120. The enclosure 120 has an inlet port 201 and outlet port 202. The enclosure 120, which is typically at room temperature, has its internal walls lined with thermal shield 121 which reduces radiative and convective heat load to the containers 204 which operate at reduced temperature. During a sorption cycle, the zeolite containers 204 and the zeolite material 205 inside are maintained at a temperature of approximately 77° K and the outlet port 202 is closed. A dry mixture of oxygen and nitrogen free of condensable vapors and gases, and chilled to about 100°K, enters the vacuum enclosure 120 through the inlet port 201, flows through central openings in containers 204 and into the gaps therebetween, through the permeable walls 206 and is sorbed onto zeolite 205. During a desorption (i.e. regeneration) cycle, the inlet port 201 is closed and the outlet port 202 is opened. The zeolite 205 is warmed up to approximately 200° K. to release sorbed gases. Possible approaches to warming the zeolite include electric heating with heating elements 209 in contact with the zeolite 205, heating with warm fluid acting through a heat exchanger in contact with the zeolite, or by flushing the zeolite with warm gas.

A suitable configuration of a heat exchanger, designated generally as 207, embedded in zeolite 205, is shown in FIG. 4. The heat exchanger 207 comprises fluid passages 231 and fins 232 in contact with the zeolite 205. By alternating between warm and cold heat transfer fluid in passages 231, this kind of heat exchanger can be used to warm the zeolite 205 during the regeneration cycle and chill the zeolite 205 during the sorption cycle. Flushing the zeolite 205 with gas can be performed by introducing a warm dry gas such as nitrogen or argon inside the vacuum enclosure 120 (FIG. 3) in the proximity of the inlet port 201, the gas flowing around and into containers 204, warming up the zeolite 205 therein, and allowing the zeolite 205 to release adsorbed gas. Desorbed gas and flush gas (if used) are removed through the outlet port 202 and fed into a auxiliary vacuum pump 144. During a sorption cycle, the zeolite 205 is chilled to a temperature of approximately 77° K. In preparation for a sorption cycle, the vacuum enclosure 120 is evacuated prior to chilling the zeolite 205. The zeolite 205 can be chilled by applying a cryorefrigerant into a heat exchanger in contact therewith as already explained above or by flushing the zeolite 205 with a cold light noble gas. Because light noble gases such as helium, neon, and, to some degree also, argon are not significantly sorbed by zeolites, such gases can be used to flush-chill the zeolite 205 without filling zeolite sorption sites. Flushing the zeolite 205 with light noble gas for the purpose of heating or chilling can be made more effective if, during the flush process, the central openings in the containers 204 are mechanically blocked, thereby forcing the flush gas to flow through the containers 204 and zeolite 205 therein.

The heat leased during the sorption process is deposited into the zeolite 205 and, unless this heat is rejected into refrigerant, the zeolite 205 temperature will rise. In order to tolerate such a temperature rise without significantly reducing sorption capacity of the zeolite 205, the zeolite 205 can be initially chilled to a substantially lower temperature than the normal operating temperature of approximately 80° K. During the sorption process, the heat of sorption is rejected by the thermal mass of the zeolite 205 and the zeolite 205 temperature is allowed to rise up to about 80°K.

Although the SECOIL system described above and in U.S. Pat. No. 6,154,478, issued to Vetrovec represents a significant improvement in COIL system efficiency and operation, there are several areas that could be improved. For example, laboratory experiments and system studies show that the SES is a large fraction of the total SECOIL system weight, and has extremely high power and refrigerant demand, due to: (1) the very large heat release on cryosorption of the laser exhaust into the zeolite; (2) extremely low temperatures at which zeolite must operate to absorb the diluent and other exhaust gases efficiently; and (3) very large power and refrigerant demand, as well as the special equipment required to reprocess the SES. Thus, while the SECOIL system has significant merit, it turns out to have a key problem in supportability, both for military and commercial applications.

Therefore, there exists a need to reduce the weight, volume, and power consumption of the SECOIL system, especially the SES component thereof.

BACKGROUND ART

U.S. Pat. No. 4,360,923 issued to Thayer, III et al. discloses a method and apparatus for tailoring the concentration profiles of reactant and diluent species in the gas stream of a pulsed chemical laser provide a substantially uniform initial chemical reaction rate and index of refraction across the laser cavity. In the preferred embodiment, a gas stream is composed of the two reactant species, molecular hydrogen (or deuterium) and molecular fluorine, diluent species argon and helium, and a trace of oxygen as a preinitiation inhibitor. A substantially uniform initial chemical reaction rate within the laser cavity is obtained by tailoring the concentration profile of the fluorine across the cavity to compensate for the variation in absorption of UV initiation radiation across the cavity along the axis of initiation. The index of refraction of the gas mixture is kept constant within the cavity by varying the concentration of diluent gases to compensate for the variation in the index of refraction that would otherwise result from the tailoring of the fluorine concentration profile. A mathematical model of UV radiation absorption in the laser cavity is developed on the basis of the specific geometry of the laser cavity and its associated source of UV initiation radiation. A radiation absorption analysis is then performed to define the fluorine concentration profile that provides the desired degree of uniformity of the initial chemical reaction rate. An injector/mixer manifold provides a gas stream having the desired reactant gas concentration profile, as well as a diluent gas concentration profile which provides a uniform index of refraction across the reagent stream.

U.S. Pat. No. 4,650,416 issued to Warren, Jr. et al. discloses a combustor using $D_2/NF_3$/He in a laser gain generator in a cylindrical gas laser. The combustor includes a plurality of primary rings having fuel, oxidizer and diluent orifices therein. Fuel and oxidizer orifices form a triplet injector set that provides a reactant set. two diluent orifices form a diluent injector set that provides a diluent set. These sets alternate about each primary ring and from one primary ring to the adjacent primary ring. Because the diluent set does not mix directly with the reactant set initially, a greater percentage of lasing products are formed because of the higher temperature in the reacting zone. Diluent is mixed as required at a later stage in the flow.

U.S. Pat. No. 4,653,062 issued to Davis et al. discloses an oxygen-iodine laser system that includes a source of gaseous singlet delta oxygen $O_2(^1\Delta)$ and a source of gaseous iodine monochloride, ICl, that directs their respective gases to manifolds and then to a mixing reacting nozzle. The nozzle discharges the mixed gases into a lasing cavity. When mixed the ICl dissociates into atomic iodine, I, and atomic chlorine, Cl, in the presence of the excited oxygen. The atomic iodine is subsequently excited to $I(^2p\frac{1}{2})$ lasing state by the excited oxygen. The lasing cavity, which includes optical means for extracting radiation, includes exhaust ports connected to an exhaust system. The advantage of using ICl in the laser rather than conventional source of atomic iodine is that for a given temperature the operating pressure of the laser can be higher without encountering efficiency reducing condensation of the iodine.

U.S. Pat. No. 4,780,880 issued to Dickerson discloses a method for enhancing the lasing action in a chemical oxygen-iodine laser wherein a gas stream having a desired reactant gas concentration profile is combined with a diluent gas concentration profile using hydrogen as the diluent gas.

U.S. Pat. No. 4,785,461 issued to Hook et al. discloses a premixed cold reaction CW chemical laser which places the secondary injectors which input fuel and/or diluent in the exit walls of the primary nozzle. These injectors are acutely angled thereto and are arranged in rows and are further grouped therein where a first injector inputs a pure diluent, a second group of injectors inputs independently of a third group.

U.S. Pat. No. 4,787,091 issued to Wagner discloses a chemical iodine laser system provided with a reactive iodine producing container for housing a reactive iodine generating composition. Singlet delta oxygen produced by oxygen generator is mixed with iodine atoms and conveyed to a laser cavity.

U.S. Pat. No. 4,924,475 issued to Hinchen discloses a laser having a gain medium which includes boron oxide (BO) shown to have an increased optical power output and to achieve other benefits from the addition of carbon tetrafluoride ($CF_4$) to the gain medium. $CF_4$, when mixed with BO, induces a vibrational relaxation of a $BO(A^2\pi)$ population to a single vibrational level without a significant quenching of the $BO(A^2\pi)$ state. The rate of vibrational relaxation induced by the $CF_4$ additive occurs in an interval of time which is less than that associated with the radiative decay and quenching of the $BO(A^2\pi)$ state.

U.S. Pat. No. 5,199,041 issued to Schmiedberger et al. discloses a method of modulating an oxygen-iodine laser by applying an external magnetic field having an intensity of up to 800 $A.cm^{-1}$ the active zone of the laser and, at the same time, changing the magnetic field intensity to change the output power of the laser.

U.S. Pat. No. 5,802,095 issued to Schall discloses an improved oxygen-iodine laser comprising a reaction unit for the generation of a gas stream composed of excited oxygen by chemical reaction between a reaction liquid and a reaction gas, a steam trap with a condensation chamber, in which steam entrained by the gas stream is condensed onto cold surfaces, an iodine injector, which injects iodine into the gas stream to generate a laser-active gas mixture, and a laser resonator with the laser-active gas mixture flowing through it, in such a way as to obtain a gas stream as free from steam as possible using the simplest possible means, it is proposed that the cold surfaces for separation of the steam are formed by liquid surfaces of a condensation liquid moved in the condensation chamber.

U.S. Pat. No. 5,859,863 issued to Clendening, Jr. et al. discloses a system for preparing excited molecular oxygen in the excited singlet-delta electronic state for use in a chemical laser that minimizes salt formation utilizing the common ion effect. In one version, basic hydrogen peroxide is formed by combining $H_2O_2$ and at least two bases. In another version of the invention, the basic hydrogen peroxide is reacted with a gas containing at least two halogen species.

U.S. Pat. No. 6,004,449 issued to Vetrovec discloses an alkaline peroxide cell for electrolytic regeneration of spent basic hydrogen peroxide from a chemical oxygen iodine laser. The cell has separate compartments for regenerating chlorine and for regenerating basic hydrogen peroxide. Regenerated chlorine and basic hydrogen peroxide are suitable for use in a chemical oxygen iodine laser.

OBJECTS AND SUMMARY OF THE INVENTION

It is therefore a principal object of this invention to provide a new and improved chemical laser system.

It is another object of this invention to provide a new and improved chemical oxygen-iodine laser system.

It is another object of this invention to provide a new and improved sealed exhaust chemical oxygen-iodine laser system.

It is another object of this invention to provide a new and improved sealed exhaust system for a chemical oxygen-iodine laser system.

It is another object of this invention to reduce the size, weight, and power consumption of a sealed exhaust chemical oxygen-iodine laser system.

It is another object of this invention to reduce the size, weight, and power consumption of a sealed exhaust system for a chemical oxygen-iodine laser system.

In accordance with one embodiment of the present invention, a sealed exhaust chemical oxygen-iodine laser system is provided, comprising:
  (a) a chemical oxygen-iodine laser system including a laser cavity; and
  (b) a sealed exhaust system for removing exhaust gas from the laser cavity, the sealed exhaust system comprising:
    (i) a condenser assembly for condensing a condensable material contained in the exhaust gas; and
    (ii) a sorption assembly for sorbing a sorbable material contained in the exhaust gas.

In accordance with another embodiment of the present invention, a sealed exhaust chemical oxygen-iodine laser system is provided, comprising:
  (a) a chemical oxygen-iodine laser system including a laser cavity;
  (b) a condensable non-reactive diluent gas introduced into the chemical oxygen-iodine laser system; and
  (c) a sealed exhaust system for removing exhaust gas from the laser cavity, the sealed exhaust system being in communication with the laser cavity, the sealed exhaust system comprising:
  (i) a condenser assembly for condensing a condensable material contained in the exhaust gas; and
  (ii) a sorption assembly for sorbing a sorbable material contained in the exhaust gas, the sorption assembly being in communication with the condenser assembly, the sorption assembly being downstream of the condenser assembly.

In accordance with another embodiment of the present invention, a method of operating a sealed exhaust chemical oxygen-iodine laser system is provided, comprising:
  (a) providing a chemical oxygen-iodine laser system including a laser cavity;
  (b) introducing a condensable non-reactive diluent gas into the chemical oxygen-iodine laser system; and
  (c) providing a sealed exhaust system for removing exhaust gas from the laser cavity, the sealed exhaust system being in communication with the laser cavity, the sealed exhaust system comprising:
    (i) a condenser assembly for condensing a condensable material contained in the exhaust gases; and
    (ii) a sorption assembly for sorbing a sorbable material contained in the exhaust gas, the sorption assembly being in communication with the condenser assembly, the sorption assembly being downstream of the condenser assembly.

These and other objects, advantages and novel features of the present invention will become apparent from the following detailed description of the invention when considered in conjunction with the accompanying drawings.

BRIEF DESCRIPTION OF THE DRAWINGS

The same elements or parts throughout the figures are designated by the same reference of characters.

DETAILED DESCRIPTION OF THE PREFERRED EMBODIMENTS

In accordance with the general teachings of the present invention, an improved SECOIL system is provided wherein the diluent, operating conditions, and sealed exhaust materials are selected so that the system weight, volume, and power consumption, particularly that portion attributed to the SES itself, is minimized or at least reduced somewhat. This would permit a SECOIL system weapon to be either packaged in a smaller vehicle, or the laser effectiveness (power or lasing duration) to be increased. It also permits SECOIL systems for commercial and industrial applications (e.g., laser welding and metal cutting) to operate with much higher power efficiency and lower power consumption.

The present invention modifies the operating conditions and gases currently used in conventional SECOIL systems, as well as the materials used in the SES, to obtain the benefits of the SES while reducing the system weight and size, logistic support requirements, and power consumption of the system.

By way of comparison, the present invention differs from the previously-described conventional SECOIL system in several respects. First, the operating conditions and diluent are selected such that the majority of the laser exhaust gas is condensed in a gas chiller rather than being cryosorbed in the zeolite bed. Second, the gas chiller serves to remove not only minor trace condensables (e.g., $I_2$ and $H_2O$) but also the diluent, which is generally the largest constituent in the laser exhaust gas. Third, the diluent, rather than being selected from the group of nitrogen and argon, is selected from a class of compounds which have specific vapor pressure characteristics both from the viewpoint of exhaust management and the nozzle operating conditions. Examples of this class include chlorine, xenon, freon-11, and R134A. Fourth, the heat release to be managed is drastically reduced by selection of operating materials and conditions which favor condensation to a liquid or solid phase rather than cryosorption to a more stable (i.e., lower vapor pressure) phase. Fifth, the sealed exhaust condenses the majority of the laser exhaust using high thermal mass materials, including phase change media, rather than zeolites. Sixth, the power and material requirements for reprocessing the sealed exhaust are greatly reduced by careful selection of diluent and operating conditions.

Figure 1:
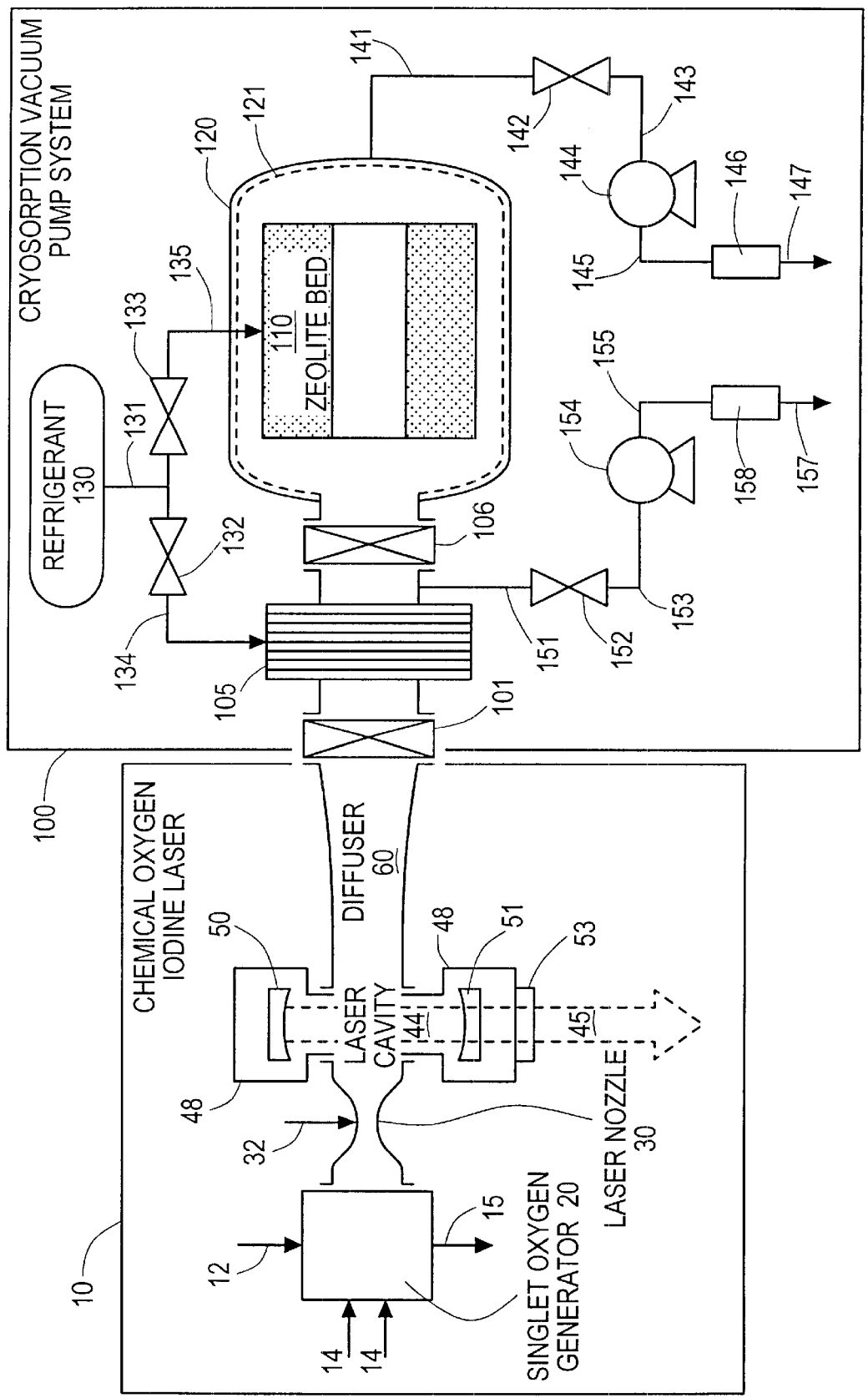
FIG. 1 is a schematic illustration of a cryosorption vacuum pump system with an associated COIL system in a conventional SECOIL system.
Figure 2:
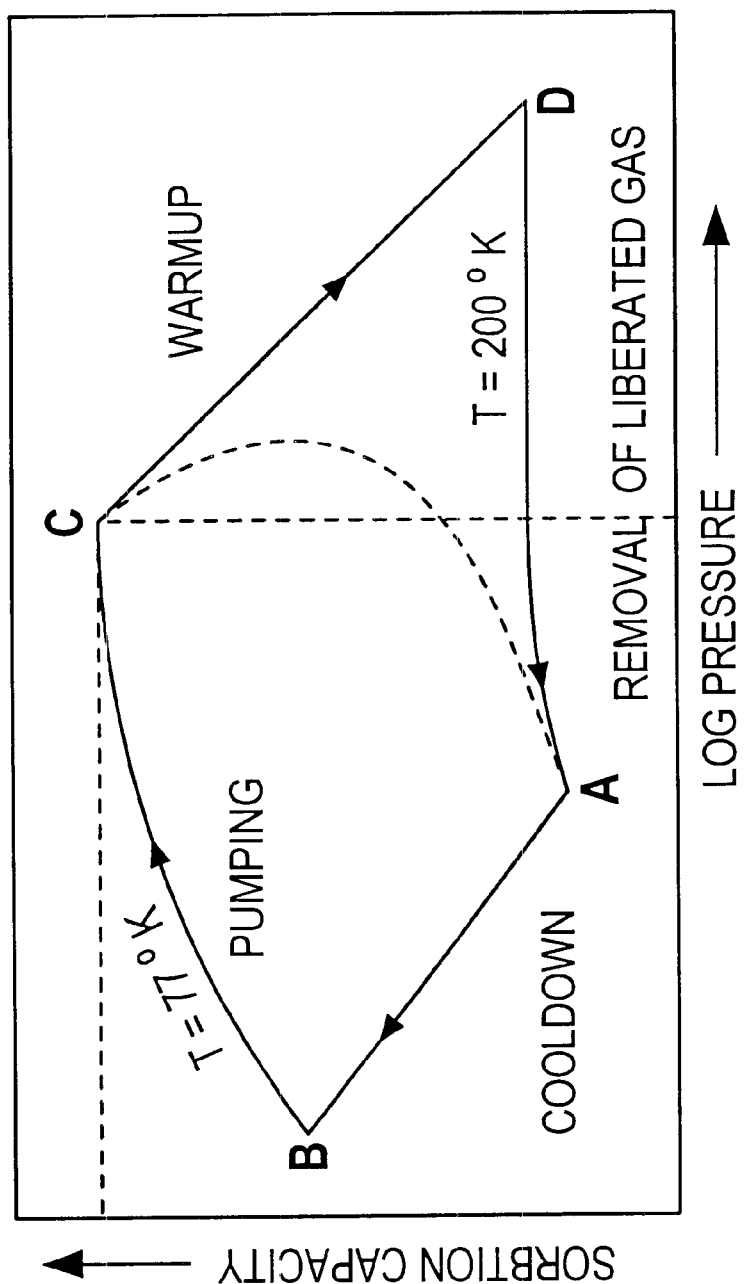
FIG. 2 is a plot of sorption capacity versus log pressure to illustrate the working function of the zeolite used in conjunction with the COIL system/cryosorption vacuum pump system.
Figure 4:
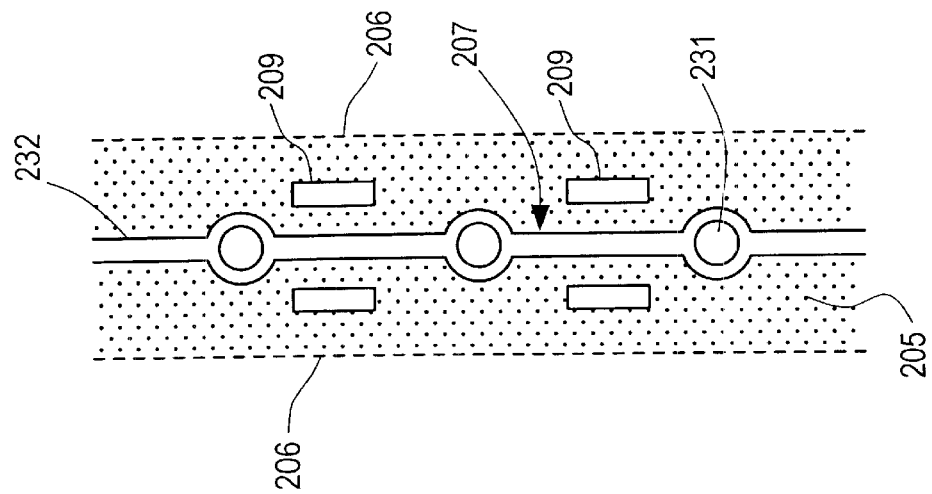
FIG. 4 is an enlarged cross-sectional view of a section of a zeolite container.
Figure 3:
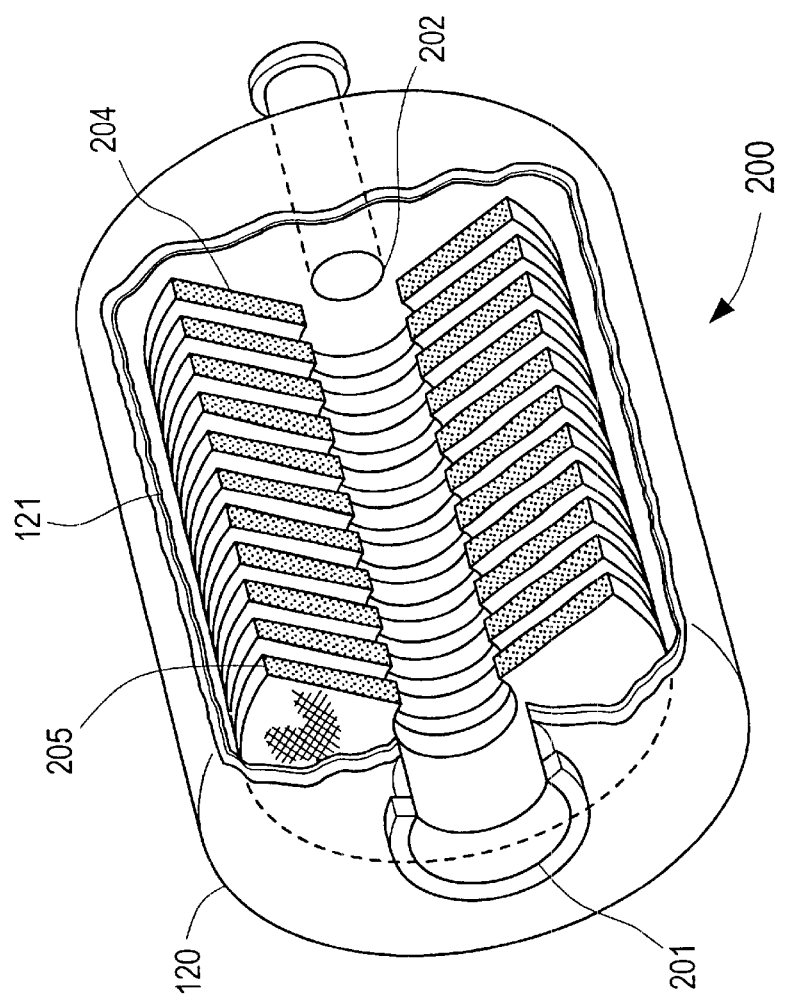
FIG. 3 is a perspective view, partially cutaway, of a vacuum vessel containing zeolite.
Figure 5A:
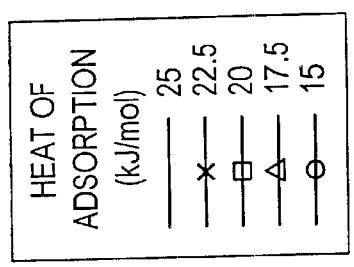
FIG. 5A is a graphical illustration of the fraction of zeolite absorption capacity used versus relative pressure for a 77° K. initial zeolite bed temperature of a conventional SECOIL system.
Figure 5A:
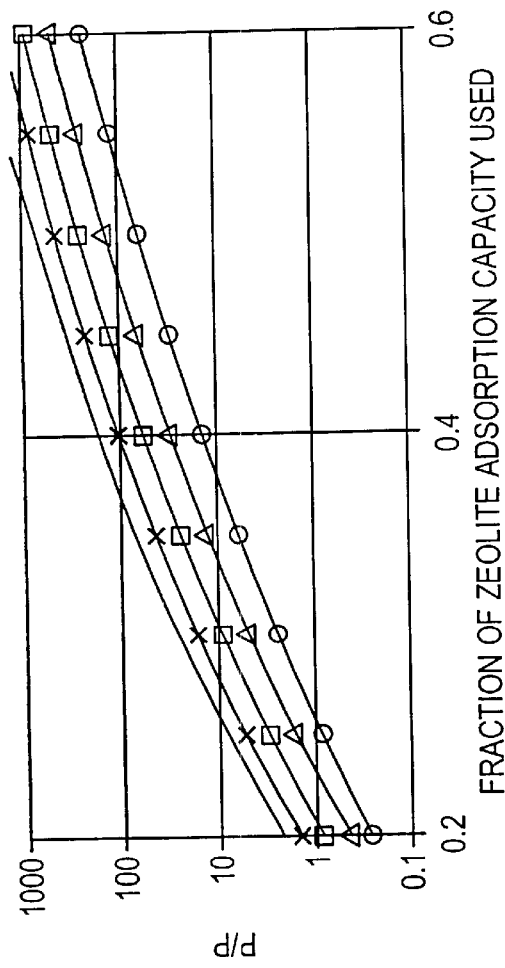
Figure 5B:
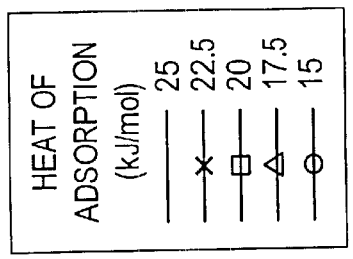
FIG. 5B is a graphical illustration of the fraction of zeolite absorption capacity used versus relative pressure for a 30° K. initial zeolite bed temperature of a conventional SECOIL system.
Figure 5B:
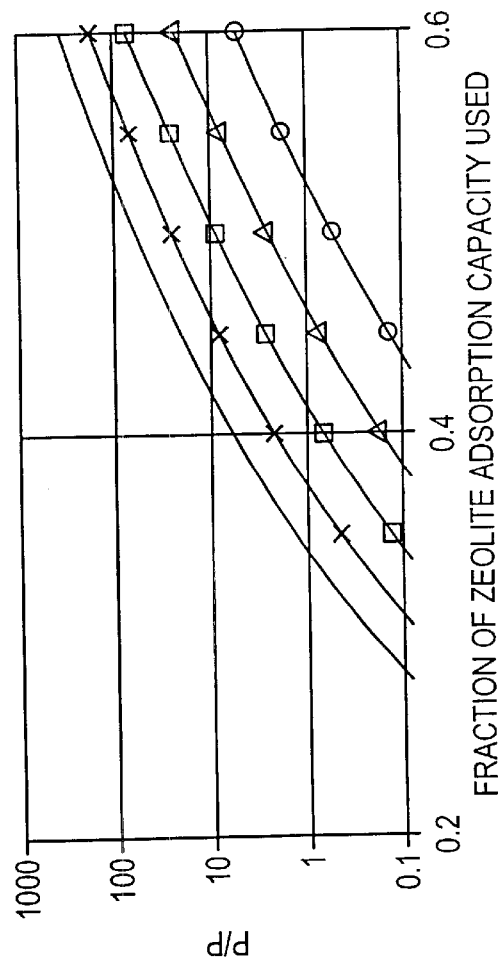

With respect to conventional SECOIL systems, the adsorption of COIL exhaust gases by zeolite is limited by thermal considerations to less than half of the zeolite capacity. Modeling derived from laboratory testing is shown in FIGS. 5A and 5B. Typical COIL exhaust pressures are in the 10–100 torr range, and the heat of adsorption from experimental data and extrapolation to lasing conditions is on the order of 25kJ/mol. This value is about twice as large as the heat of condensation for nitrogen gas to liquid nitrogen. This large additional heat is associated with forming a cryosorbed state of nitrogen or oxygen in the zeolite that has a much lower vapor pressure than the corresponding liquid state. Because of the high heat release and the relatively low heat capacity of zeolite, the weight of zeolite must be large to accommodate the gas and heat release, and the thermal load for reprocessing becomes correspondingly high. This reprocessing thermal load is also increased because it is necessary to reprocess the bed to approximately 400° K to remove the gas, and the bed must be pre-chilled to liquid nitrogen temperature (77° K.) or substantially below that for peak adsorption efficiency. The need for low bed temperatures is driven in part by a need to reduce both the weight of zeolite and the power consumption of the zeolite during reprocessing. For example, if the zeolite is pre-chilled to liquid nitrogen temperature (77° K.) only about 30–40% of zeolite capacity is usable (FIG. 5A) when operated under adiabatic conditions (i.e., without real-time cooling). Chilling to 30° K with a helium refrigeration system (FIG. 5B) will increase this to the 50% range. Most importantly, the experimental heat of adsorption is found to be about 50 to 100% higher than for condensation to liquid due to the highly stabilized zeolite structure. This causes a penalty of 10 to 40% in the zeolite capacity usable for adsorption. The weight of the zeolite required is inversely proportional to the fraction of its capacity that can be used, so using 30–50% of the zeolite capacity means that 100 to 233% excess zeolite must be used compared to the theoretical capacity. System studies indicate that the weight of the SES may amount to 25% of the total weight of the SECOIL system, so the excess zeolite requirement is a significant driver in overall system weight. The overall power consumption under these conditions may make it impractical for commercial and industrial applications, because the operating costs for a continuously-operating conventional SECOIL system will be prohibitive. Considering all of the energy uses for the SECOIL system (including production of cryogenic nitrogen), the overall electrical efficiency of the conventional SECOIL system can be reduced to as low as 0.2%, a generally unacceptable number.

Figure 6A:
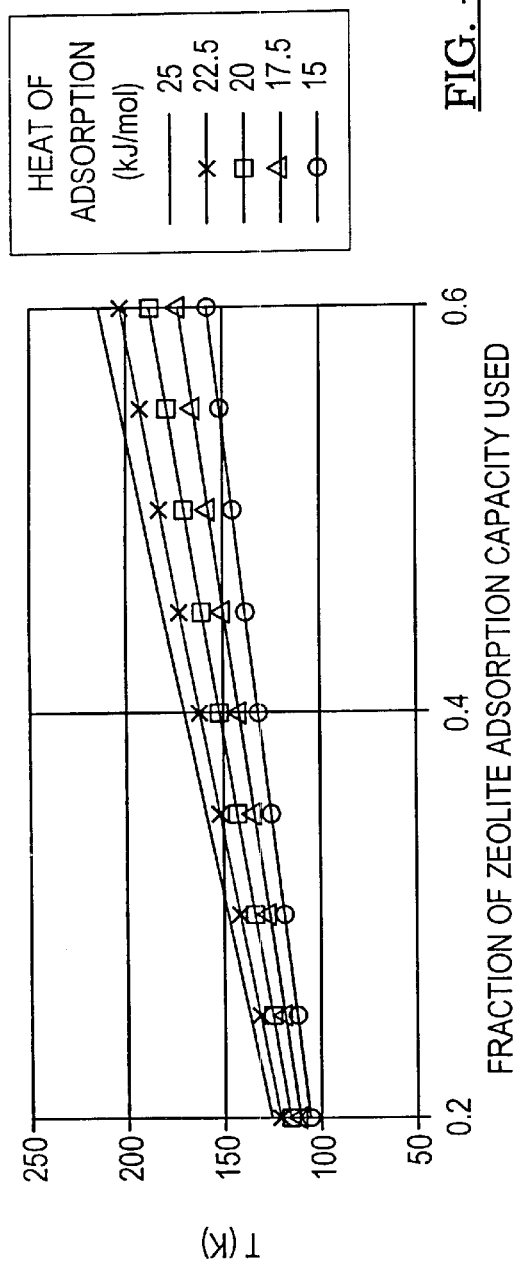
FIG. 6A is a graphical illustration of the fraction of zeolite absorption capacity used versus temperature for a 77° K. initial zeolite bed temperature of a conventional SECOIL system.
Figure 6B:
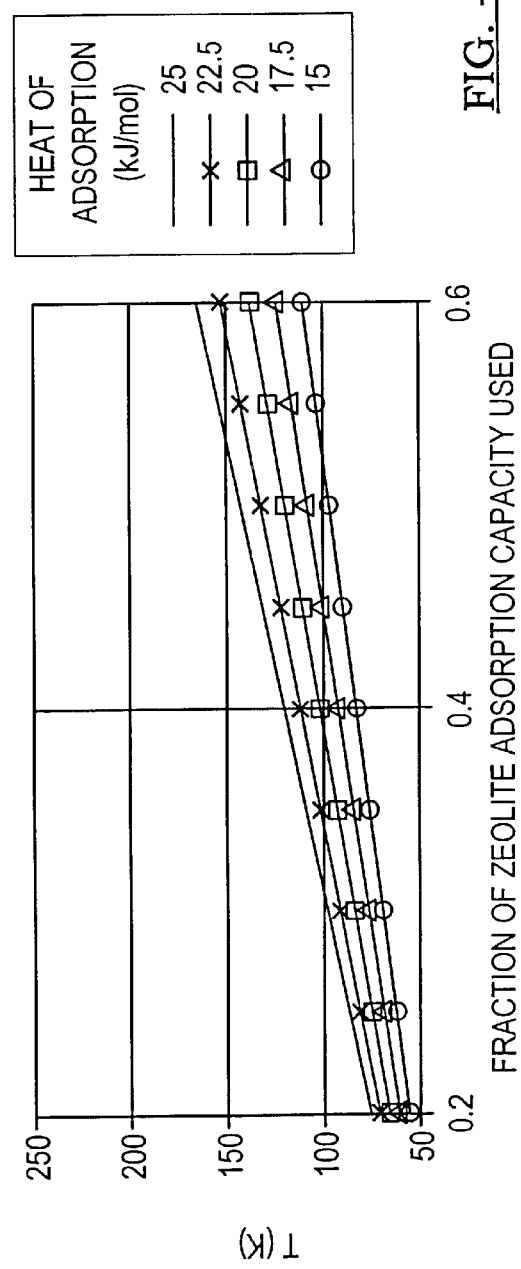
FIG. 6B is a graphical illustration of the fraction of zeolite absorption capacity used versus temperature for a 30° K. initial zeolite bed temperature of a conventional SECOIL system.

The process is also reflected in the bed temperature (FIGS. 6A and 6B). During operation of a conventional SECOIL system, the temperature rises steadily during adsorption due to the heat release. The pressure increases approximately linearly with the amount of material adsorbed and exponentially with the temperature.

FIGS. 6A and 6B illustrate some basic points that highlight the importance of the present invention. First, vacuum pumping of a gas by adsorption or condensation is largely a process of thermal management. Substantial heat is released in adsorption or condensation, and this heat will cause temperatures to rise. As a result, the pressure above the condensed phase will rise until it exceeds the maximum exhaust pressure of the conventional SECOIL system, at which time laser operation must stop or be severely degraded. Second, significant extra heat is released when the adsorption is to a state which is more stable (i.e., of lower vapor pressure) than the liquid or solid. This results in an additional weight and performance penalty to achieve the low pressures required for laser cavity operation. Third, because of the short duration of weapon operation and the thermal properties of zeolite over the usable temperature range, real-time cooling of the system by liquid nitrogen is complex and may in fact be heavier than adiabatic operation using a sufficient amount of medium to control temperature.

To overcome the disadvantages of current SECOIL system operation, the present invention focuses on the selection of the SECOIL system diluent gas and the configuration and materials in the SES so as to achieve, among other things, a substantial weight reduction of the SECOIL system, especially the SES component thereof.

In accordance with one embodiment of the present invention, it is preferred to select the diluent gas such that it: (1) provides low cavity temperatures so that laser gain and efficiency remain relatively high; (2) can be readily pumped at moderate cryogenic temperatures and with minimum thermal release on condensation; (3) utilizes SES materials with low thermal cycle requirements, in lieu of cryosorption in zeolite with its high reprocessing energy demand; and (4) does not interact adversely with the laser medium.

These conditions are met with selection of a diluent that: (1) can be condensed (rather than cryosorbed) in the SES; (2) does not interact chemically with the gas species in the cavity; and (3) can be introduced into the laser nozzle as a gas at sufficiently high pressure and low temperature without condensation so that the cavity flow is efficiently pumped.

The SES can then be staged such that the diluent and other condensables can be removed in a first stage, while the oxygen can be cryosorbed using a relatively smaller and lighter zeolite bed. Acceptable choices for the diluent include gases such as chlorine, heavy inert gases such as krypton and xenon, or their mixtures, and various freons (e.g., chlorofluorocarbons) and freon substitutes (e.g., hydrofluorocarbons). The diluent gases proposed for current SECOIL systems, nitrogen and argon, are unacceptable for use with the present invention.

Figure 7:
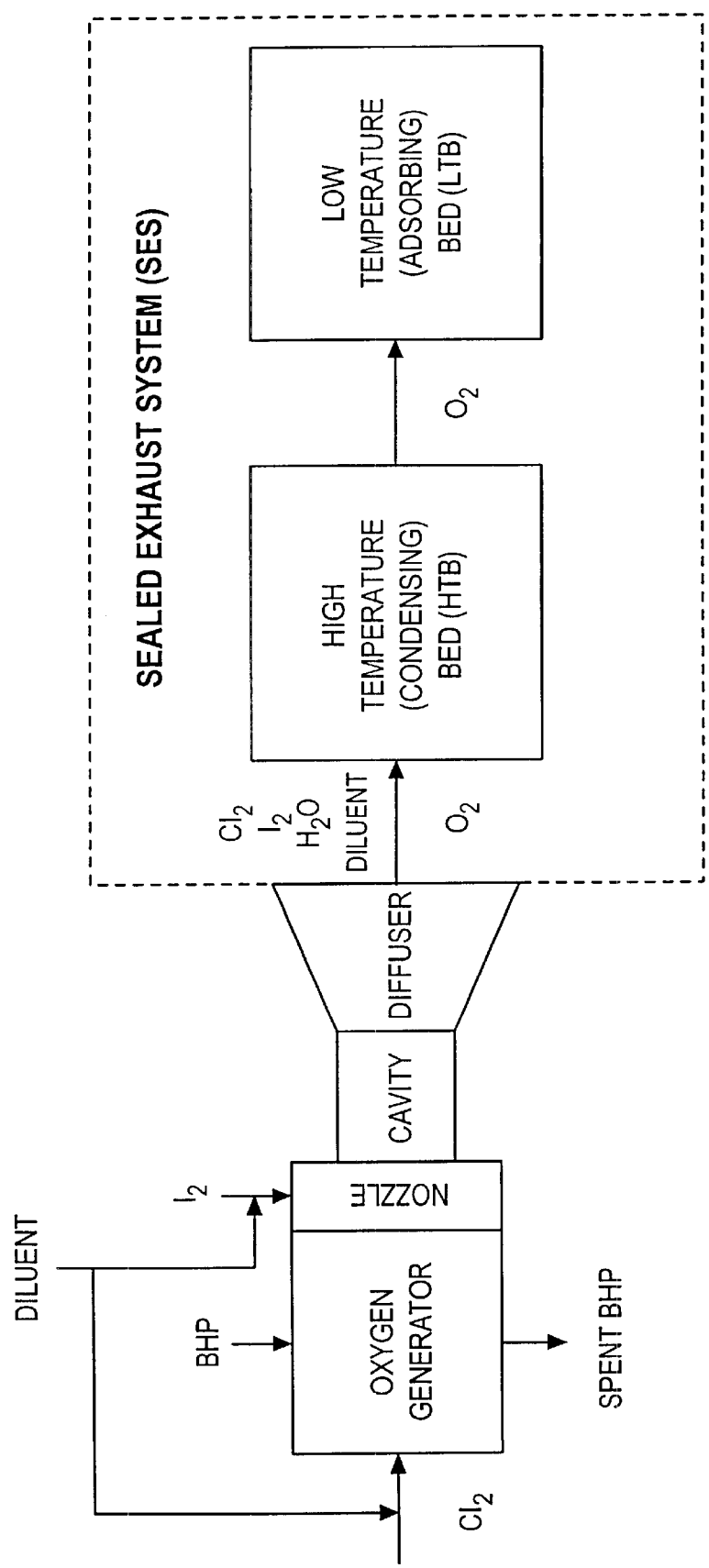
FIG. 7 is a block diagram illustrating a sealed exhaust system for use in conjunction with a COIL system, in accordance with one aspect of the present invention.

FIG. 7 is a block diagram of a SECOIL system, in accordance with one aspect of the present invention. The two main components are the COIL system and the SES system, which are in fluid communication with one another. The operation of the oxygen and gain generators is essentially the same as in prior COIL systems, except that the diluent is selected as described above. The exhaust gas, comprising principally diluent, chlorine, water, iodine, and oxygen then enter the High Temperature Bed (HTB), through a suitable conduit, where all of these gases, with the exception of oxygen, are completely or substantially completely condensed to solids or liquids. The balance of these gases, and the oxygen, then pass into the Low Temperature Bed (LTB), through a suitable conduit, which contains a zeolite adsorption bed. The remaining gases are then adsorbed in the LTB. The HTB will, in general, pump gases with a lower specific mass and a lower reprocessing power consumption than the LTB because: (1) operating temperatures can change over a wider range; (2) materials can be selected for high specific heat; (3) materials that undergo a change of phase (i.e., melting) can be used to further increase the heat adsorbed per unit of mass; (4) reprocessing can occur at a relatively low temperature, i.e., no higher than the melting point of the condensed gases, which is typically a cryogenic condition for the diluents considered; and (5) reprocessing can occur without heating of the bed when the condensed materials are liquid at the final system temperature.

Suitable materials that do not undergo phase change include, without limitation, aluminum and plastics such as, but not limited to polyethylene and nylon. Phase change materials include, without limitation, the hydrocarbon waxes, alcohols, and other substituted hydrocarbons.

Figure 8:
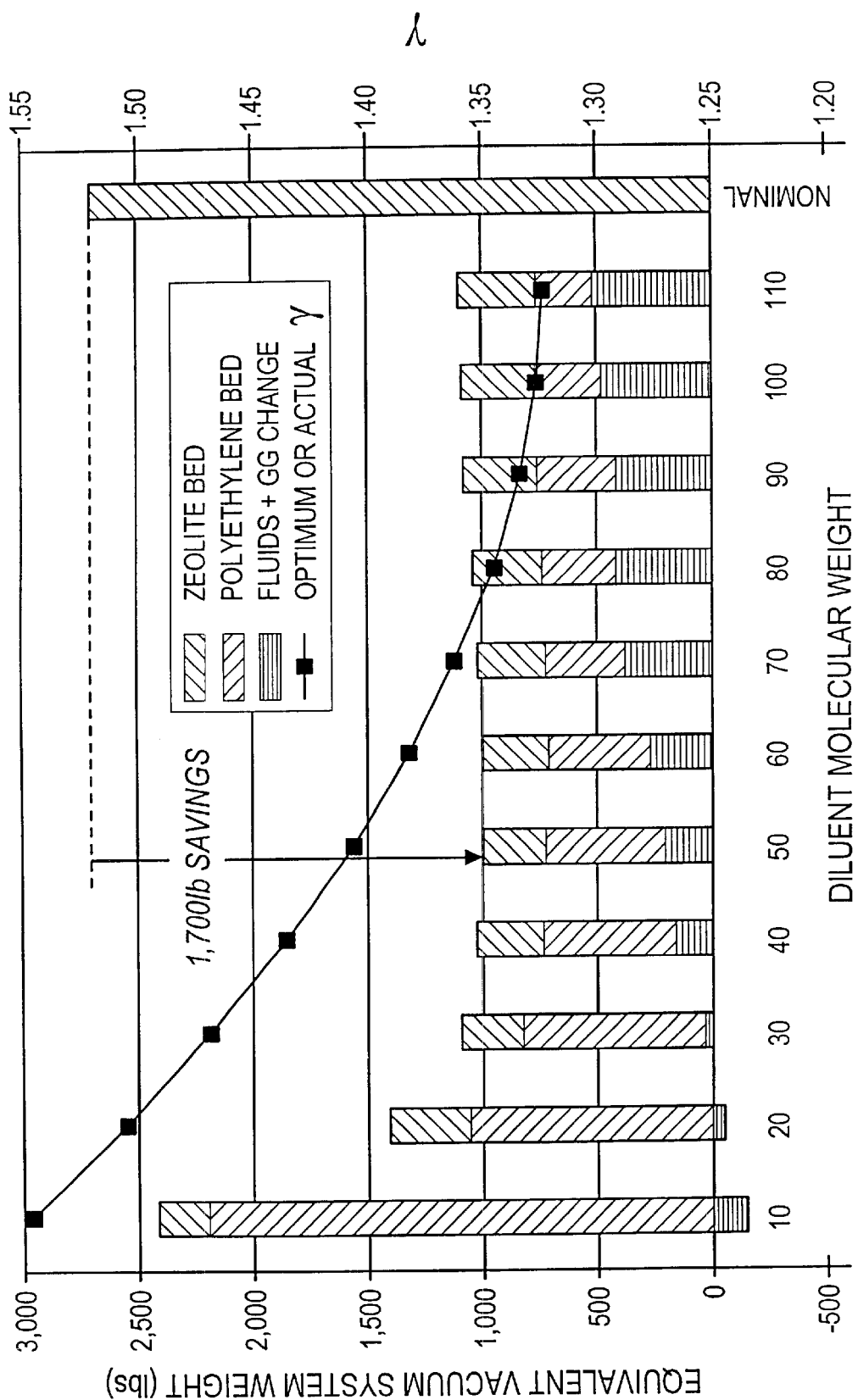
FIG. 8 is a graphical illustration of the weight savings achievable by employing the sealed exhaust system of the present invention in conjunction with a COIL system.

Analyses of a current SECOIL system have been run from a simplified model of COIL system performance. The key weight trade is shown in FIG. 8. As an example, the nominal ATL (Airborne Tactical Laser) system uses 5 mols $N_2$/mol $Cl_2$ as diluent. This trade was conducted at a fixed mass flow of diluent to fix two factors: (1) the exhaust gas pressure; and (2) the limitation imposed by beam quality on the optical properties of the laser cavity medium. This trade shows that the optimum system uses approximately 2 moles of diluent and can achieve an approximately 1,700 lb. reduction from the SES weight of 2,700 lb. and the total laser system weight of 10,400 lb. This weight reduction is approximately equal to the weight of more than 4 standard laser shots or one half of the ATL magazine. For a commercial system, the reprocessing energy requirement is reduced by a factor of approximately 6, increasing the system electrical efficiency from 0.35% to over 2%. This is a major operating cost reduction.

The HTB preferably comprises: (1) a bed of heat storage media, which may be passive or undergo a phase change on heating; and (2) suitable gas passages to permit the laser exhaust gas to flow through the bed with acceptably low pressure drop. During the course of laser operation, the bed temperature goes from a very low temperature, typically that of liquid nitrogen or below, to the relatively high temperature at which the vapor pressure of one or more of the gases condensed becomes unacceptably high for laser operation. This will typically be on the order of 70% of the boiling point of these species, with some variation encountered depending on the species and the allowable condensation pressure. By selecting a gas with a relatively high boiling point, typically 200–300° K., this temperature change can be made much larger than that encountered in the SES bed as described above.

Reprocessing the HTB is much simpler than reprocessing the LTB. It is may be necessary to remove the LTB from the air vehicle so that it can be heated to approximately 200° C. to desorb gases and then chilled to approximately 30 to 77° K. (−243 to −196° C.) using a flowing helium loop or liquid-cooled internal cooling elements. Liquid and gaseous nitrogen cannot be used directly for chilling because they will adsorb onto the zeolite, and the gases desorbed from the bed must be scrubbed for halogen removal. The LTB must then be evacuated and re-installed, if required, on the air vehicle. By contrast, the HTB is reprocessed by defrosting the diluent (if not already liquid), draining the diluent, and then chilling the HTB by direct contact with liquid nitrogen. The diluent can be drained to a vessel on board the ATL and separated and reused immediately for laser operation.

The selection of the diluent can be made based on the performance issues addressed above and on the compatibility with the lasing species. The species which may interact with the diluent are: $O_2(^1\Delta)$, $O_2(^1\Sigma)$, $I^*$ and $I_2^*$. Evaluation of literature data indicates that it is the interaction with $I_2^*$ which is most likely to be the limitation on the selection of the diluent. Acceptable compounds that are near the molecular weight optimum shown in FIG. 8 include $Cl_2$, $CH_2F_2$ and $CHF_3$, and mixtures of krypton and xenon. $Cl_2$ is already present in the cavity due to its partial reaction with BHP to give $O_2(^1\Delta)$. $CH_2F_2$ and $CHF_3$ are stable, readily available for use as substitutes for freon, are environmentally acceptable, and pose little or no danger to operating personnel. The use of the krypton/xenon mixture is an economic issue because of the high cost of these gases, although in a fully developed SECOIL system the gases can be recirculated with little loss.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. sealed exhaust chemical oxygen-iodine laser system, comprising:
   (a) a chemical oxygen-iodine laser system including a laser cavity through which an active lasing material and a diluent are flowed;
      wherein the active lasing material consists essentially of oxygen, iodine, or combinations of oxvaen and iodine; and
   (b) a sealed exhaust system for removing exhaust gas from the laser cavity, the sealed exhaust system comprising:
      (i) a condenser assembly for condensing a condensable material contained in the exhaust gas including a substantial portion of said diluent; and
      (ii) a sorption assembly for sorbing a sorbable material contained in the exhaust gas.

2. The invention according to claim 1, further comprising a condensable non-reactive diluent gas introduced into the chemical oxygen-iodine laser system.

3. The invention according to claim 2, wherein the diluent gas is comprised of the group consisting of chlorine, krypton, xenon, chlorofluorocarbons, hydrofluorocarbons, and combinations thereof.

4. The invention according to claim 2, wherein the condensable material is selected from the group consisting of diluent, chlorine, water, Iodine, and combinations thereof.

5. The invention according to claim 1, wherein the sorbable material is oxygen.

6. The invention according to claim 1, wherein the condenser assembly comprises a bed of heat storage media and means for permitting the exhaust gas to flow through the bed.

7. The invention according to claim 1, wherein the sorption assembly comprises a bed of adsorbent media.

8. The invention according to claim 1, further comprising:
   (c) providing a first removal assembly for removing the condensable material from the condenser assembly; and
   (d) providing a second removal assembly for removing the sorbable material from the sorption assembly.

9. A sealed exhaust chemical oxygen-iodine laser system, comprising:
   (a) a chemical laser system including a laser cavity;
   (b) a condensable non-reactive diluent gas introduced into the chemical laser system; and
   (c) a sealed exhaust system for removing exhaust gas from the laser cavity, the sealed exhaust system being in communication with the laser cavity, the sealed exhaust system comprising:
      (i) a condenser assembly for condensing a condensable material contained in the exhaust gas; and
      (ii) a sorption assembly including a cooled non-reactive sorption material for sorbing a sorbable material contained in the exhaust gas, the sorption assembly being in communication with the condenser assembly, the sorption assembly being downstream of the condenser assembly; and
      (iii) a vacuum pump assembly in communication with the sorption assembly, wherein the vacuum pump assembly pumps exhaust gases desorbed from the sorption assembly.

10. The invention according to claim 9, wherein the ,diluent gas is comprised of the group consisting of chlorine, krypton, xenon, chlorofluorocarbons, hydrofluorocarbons, and combinations thereof.

11. The invention according to claim 9, wherein the condensable material is selected from the group consisting of diluent, chlorine, water, iodine, and combinations thereof.

12. The invention according to claim 9, wherein the sorbable material is oxygen.

13. The invention according to claim 9, wherein the condenser assembly comprises a bed of heat storage media and means for permitting the exhaust gas to flow through the bed.

14. The invention according to claim 9, wherein the sorption assembly comprises a bed of adsorbent media.

15. The invention according to claim 9, further comprising:
   (d) a first removal assembly for removing the condensable material from the condenser assembly; and
   (e) a second removal assembly for removing the sorbable material from the sorption assembly.

16. A method of operating a sealed exhaust chemical oxygen-iodine laser system, comprising:
   (a) providing a chemical laser system including a laser cavity;
   (b) providing active lasing materials to said laser cavity consisting essentially of oxygen, iodine, or combinations oxygen and iodine;
   (c) selecting a condensable diluent gas;
   (d) introducing a condensable diluent gas into the chemical laser system; and
   (e) using a sealed exhaust system for removing exhaust gas from the laser cavity, the sealed exhaust system being in communication with the laser cavity.

17. The method of further comprising 16, further comprising:
   (e) providing a first removal assembly for removing the condensable material from the condenser assembly; and
   (f) providing a second removal assembly for removing the sorbable material from the sorption assembly.

18. The method of claim 16, wherein the diluent gas is selected from the group comprising nitrogen, chlorine, krypton, xenon, chlorofluorocarbons, hydrofluorocarbons, and combinations thereof.

19. The method of claim 16, wherein providing a sealed exhaust system comprises:
   (a) condensing a condensable material contained in the exhaust gases; and
   (b) sorbing a sorbable material contained in the exhaust gas in a sorption assembly, the sorption assembly being in communication with the condenser assembly, the sorption assembly being downstream of the condenser assembly.

20. The method of invention claim 19, wherein condensing a condensable material comprises providing a bed of heat storage media and flowing the exhaust gas through the bed.

21. The method of claim 19, wherein sorbing a sorbable material comprises providing a bed of adsorbent media.

* * * * *